(12) United States Patent
Chung et al.

(10) Patent No.: US 6,314,067 B1
(45) Date of Patent: Nov. 6, 2001

(54) OPTICAL DISK HAVING PATTERN FOR TILT DETECTION

(75) Inventors: Chong-sam Chung; Chul-woo Lee, both of Sungnam; In-sik Park, Suwon, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/267,710

(22) Filed: Mar. 15, 1999

(30) Foreign Application Priority Data

Mar. 14, 1998 (KR) .................................................. 98-8646

(51) Int. Cl.⁷ ...................................................... G11B 7/09
(52) U.S. Cl. ...................................... 369/44.32; 369/44.28; 369/53.19
(58) Field of Search ............................ 369/44.32, 44.28, 369/44.27, 44.29, 44.23, 44.25, 44.34, 44.35, 47, 48, 54, 58, 47.1, 53.1, 53.12, 53.16, 53.19, 53.35, 53.41, 53.44

(56) References Cited

U.S. PATENT DOCUMENTS

| | | |
|---|---|---|
| 4,663,751 | 5/1987 | Kaku et al. ............................ 369/46 |
| 5,627,808 * | 5/1997 | Hajjar et al. ....................... 369/44.32 |
| 5,646,919 * | 7/1997 | Eastman et al. ............... 369/44.34 X |
| 5,703,855 | 12/1997 | Kirino et al. ............................ 369/54 |

FOREIGN PATENT DOCUMENTS

| | | |
|---|---|---|
| 0 397 354 a2 | 11/1990 | (EP) . |
| 0 662 685 A1 | 7/1995 | (EP) . |
| 6-96452 * | 4/1994 | (JP) . |
| 8-55341 | 2/1996 | (JP) . |
| 8-279160 | 10/1996 | (JP) . |
| WO 97/26651 | 7/1997 | (WO) . |

* cited by examiner

Primary Examiner—Muhammad Edun
(74) Attorney, Agent, or Firm—Staas & Halsey LLP

(57) ABSTRACT

An optical disk has a pattern for detecting an amount of a tilt of a disk. The optical disk has a code train having a pit pattern or a mirror pattern which is recorded on a concentrically or spirally formed track, such that a tilt detection pattern having a predetermined code train is recorded at least in a partial area of the disk. Thus, since a pattern for tilt detection is recorded in a portion of a disk, a tilt of a disk can be detected by a common quadrant photodetector without an additional apparatus such as a photo coupler.

37 Claims, 7 Drawing Sheets

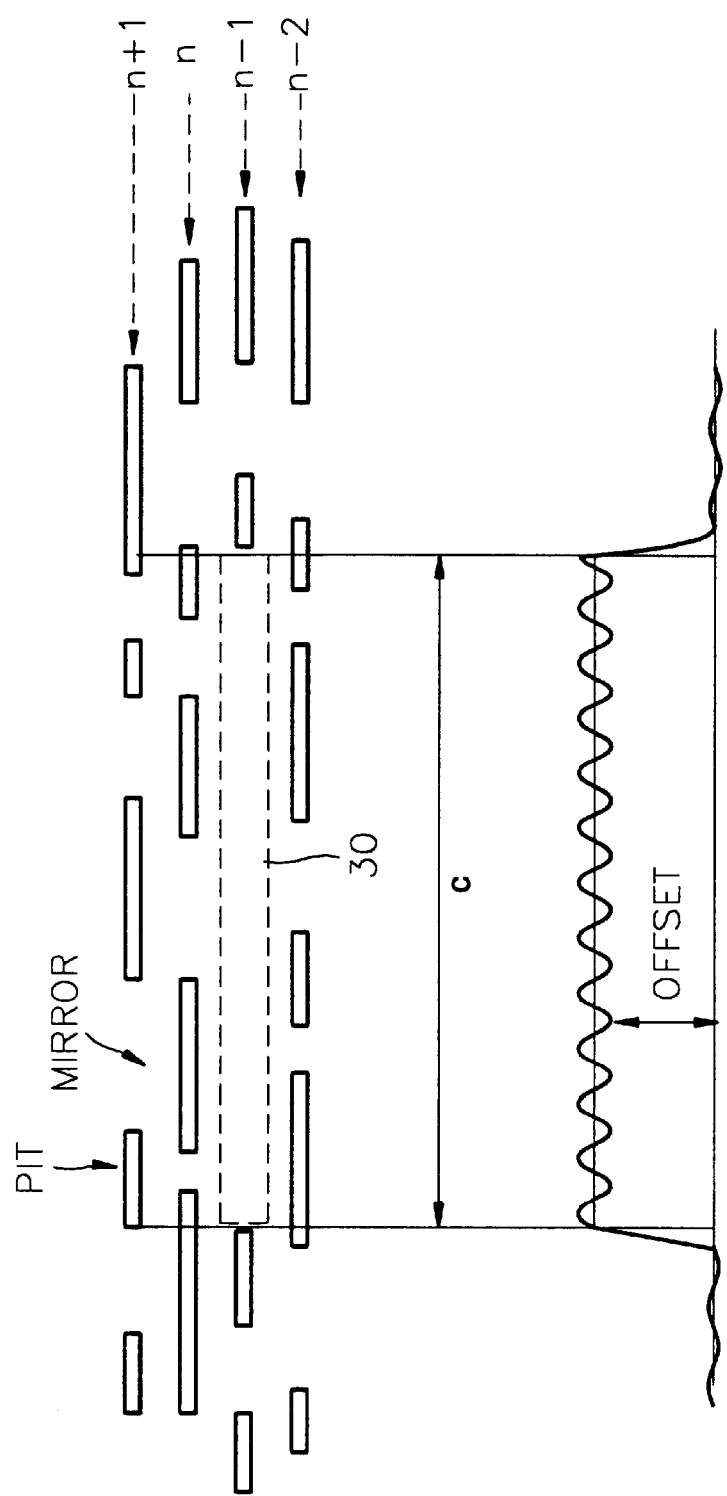

OPTICAL DISK HAVING PATTERN FOR TILT DETECTION

CROSS-REFERENCE TO RELATED APPLICATIONS

This application claims the benefit of Korean Application No. 98-8646, filed Mar. 14, 1998, in the Korean Patent Office, the disclosure of which is incorporated herein by reference.

BACKGROUND OF THE INVENTION

1. Field of the Invention

The present invention relates to an optical disk for an optical disk player, and more particularly, to an optical disk having a pattern which allows detection of degree of a tilt of disk.

2. Description of the Related Art

In a compact disk player or a digital video disk player, the tilt of a disk is a major factor in deteriorating reproduction of a signal. In particular, as the aperture ratio of an objective lens increases with increased density of a recording medium and the wavelength of a laser beam decreases, deterioration in performance due to the tilt becomes much greater. Accordingly, it is very important to correct the deteriorated performance due to the tilt of a disk having a high density recording medium.

To correct signal deterioration due to a tilt of a disk in an optical disk player, a shaft of a spindle motor is inclined, or a deck for installing a disk or optical pickup mechanisms for detecting a signal is inclined. For correction, it should be determined to what degree and in which direction a disk is inclined at the initial stage of disk reproduction.

A conventional tilt detection apparatus is shown in FIG. 1 and disclosed in U.S. Pat. No. 4,829,508. In the above tilt detection apparatus, an optical signal emitted from a light emitting diode 1 is projected to a disk 4 and the optical signal reflected by the disk 4 is received by two light receiving diodes 2 and 3, to thereby detect the degree of tilt of a disk. That is, in the structure shown in FIG. 1, if the disk 4 is not tilted, the amplitudes of optical signals detected by the two light receiving diodes 2 and 3 are substantially the same. When the disk 4 is tilted, the amplitudes of optical signals detected by the two light receiving diodes 2 and 3 are different according to the degree of tilt. The degree of tilt is detected by a differential amplifier 5 for detecting the difference between the optical signals detected by the two light receiving diodes 2 and 3. Here, the light emitting diode 1 and the light receiving diodes 2 and 3 are represented in the form of a photo-coupler 6.

The conventional tilt detection apparatus having the above structure requires an additional optical mechanism, such as a photo-coupler, for detecting the degree of tilt. Also, an additional signal processing portion for detecting the tilt of a disk is needed. Further, since an offset of a detected signal according to the initial state of a mechanical structure and disk assembly is present, the degree of detection of a signal deteriorates.

SUMMARY OF THE INVENTION

To solve the above problems, it is an object of the present invention to provide an optical disk capable of detecting the tilt of a disk without an additional mechanism.

Additional objects and advantages of the invention will be set forth in part in the description which follows and, in part, will be obvious from the description, or may be learned by practice of the invention.

Accordingly, to achieve the above and other objects of the present invention, there is provided an optical disk on which a code train having a pit pattern or a mirror pattern is recorded on a concentrically or spirally formed track, wherein a tilt detection pattern having a predetermined code train is recorded at least in a partial area of the disk.

BRIEF DESCRIPTION OF THE DRAWINGS

The above and other objects and advantages of the present invention will become more apparent by describing in detail a preferred embodiment thereof with reference to the attached drawings, in which:

FIG. 7 is a view showing another example of a pattern for tilt detection which is recorded on a recording medium according to a second embodiment of the present invention;

FIG. 8 is a waveform diagram of a tracking error signal generated by the pattern shown in FIG. 7;

DESCRIPTION OF THE PREFERRED EMBODIMENTS

Figure 1:
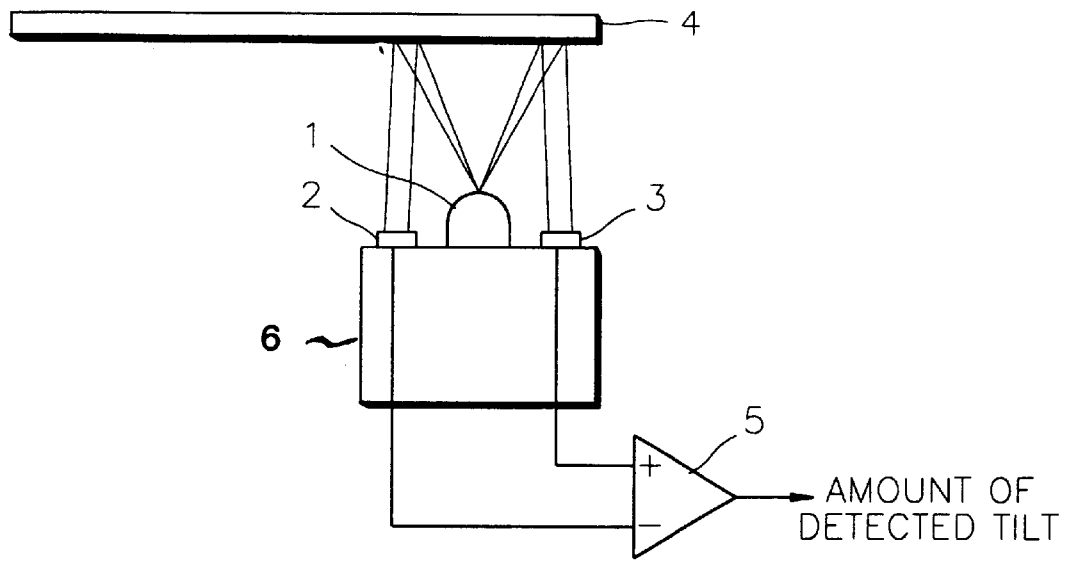
FIG. 1 is a view schematically showing the structure of a conventional tilt detection apparatus.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2A:
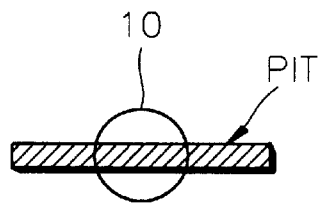
FIGS. 2A through 2C are views showing distributions of a laser beam irradiated onto a surface of a disk.
Figure 2B:
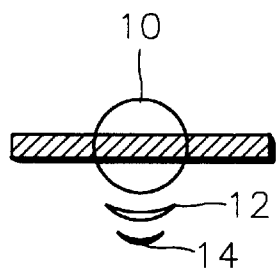
Figure 2C:
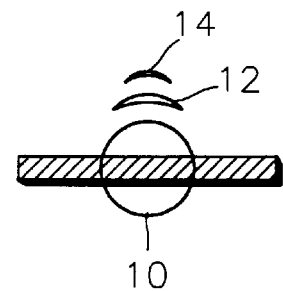

FIGS. 2A through 2C are views showing distributions of a laser beam irradiated onto a surface of a disk, in which FIG. 2A shows a case in which no tilt is generated; FIG. 2B shows a case in which there is a downward tilt, and FIG. 2C shows a case in which there is an upward tilt.

Figure 3A:
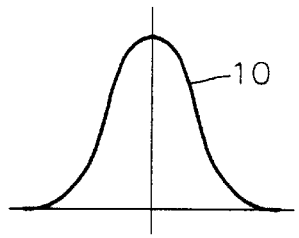
FIGS. 3A through 3C are graphs showing distribution of energy of the laser beam shown in FIGS. 2A through 2C irradiated onto a surface of a disk.

When no tilt is generated, the distribution of the laser beam makes a small circle and the energy of the laser beam is concentrated onto the center of the circle. The distribution of the energy in this case is shown in FIG. 3A. In the state in which there is no tilt, the distribution of the laser beam is like a Gaussian distribution.

Figure 3B:
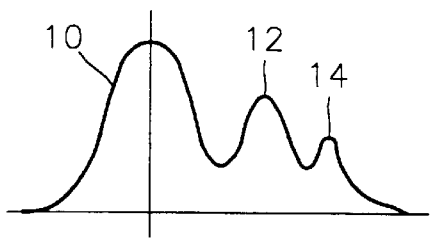
Figure 3C:
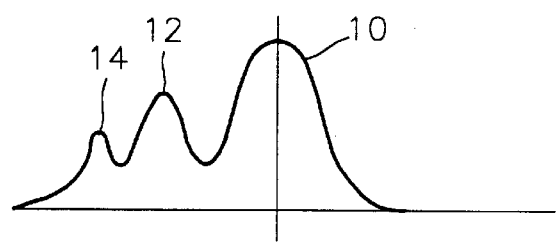

When the tilt of a disk is generated, the distribution of a laser beam expands as opposed to the case when there is no tilt of a disk as shown in FIGS. 2B and 2C and the energy of the laser beam is dispersed at the center and the periphery. That is, a main lobe 10 is generated having the highest energy generated at the center of the circle while a first side lobe 12 and a second side lobe 14 are generated at the periphery of the circle. The positions of the first and second side lobes 12 and 14 are determined depending on the direction of tilt and the first and second side 12 and 14 lobes are generated at a position near an object lens of an optical pickup which accesses the disk. The distribution of energy in these cases is shown in FIGS. 3B and 3C. FIG. 3B shows the distribution of energy when there is a downward tilt, i.e., a track in the lower portion (farther from the center) is near the object lens, and FIG. 3C shows the distribution of energy when there is an upward tilt, i.e., a track in the upper portion (closer to the center) is near the object lens.

As shown in FIGS. 3B and 3C, when a tilt is generated, since energy of a laser beam is not concentrated on a pit portion, the magnitude of an RF signal through a quadrant photodetector deteriorates.

Figure 4:
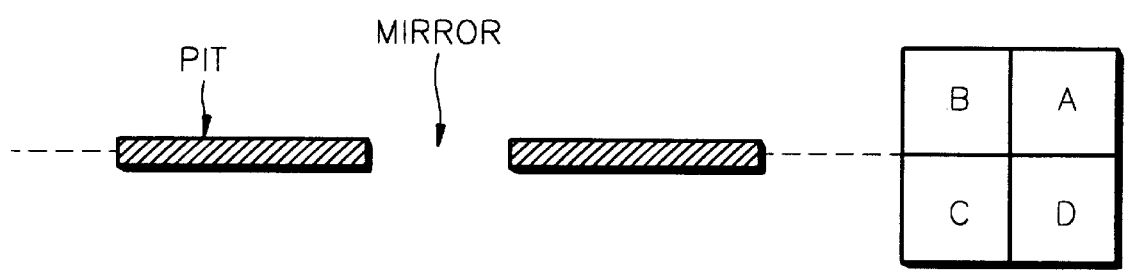
FIG. 4 is a view showing a relationship between a quadrant photodetector and a track.

FIG. 4 shows a relationship between the quadrant photodetector and a track. In the quadrant photodetector, the respective photodetector elements are referred to as A, B, C and D. Each track of the disk has pits in which a groove is formed for recording information and mirrors in which no groove is formed. In a state in which tracking is accurately set, the track of a disk and a horizontal split line of the photodetector, which is divided into A+B and C+D, coincide with each other. A tracking error signal is detected by a push-pull method, a differential phase detection (DPD) method, or a three beam method. The push-pull method detects a tracking error signal through a differential signal of the photodetector between the upper and lower portions, i.e., A+B and C+D. In the DPD method, the tracking error signal is obtained from a phase differential signal of the photodetector elements in a diagonal direction, i.e., A+C and B+D.

According to the embodiments of the present invention, an additional pattern for the detection of a disk tilt is recorded on a particular area so that, as soon as the disk is reproduced by an optical disk player, information on the tilt of disk can be obtained from the reproduced signals on this pattern. In particular, since the disk tilt is generated in two directions, a series of signals for the tilt detection is recorded on the disk in two ways for easy determination of the disk tilt.

Figure 5:
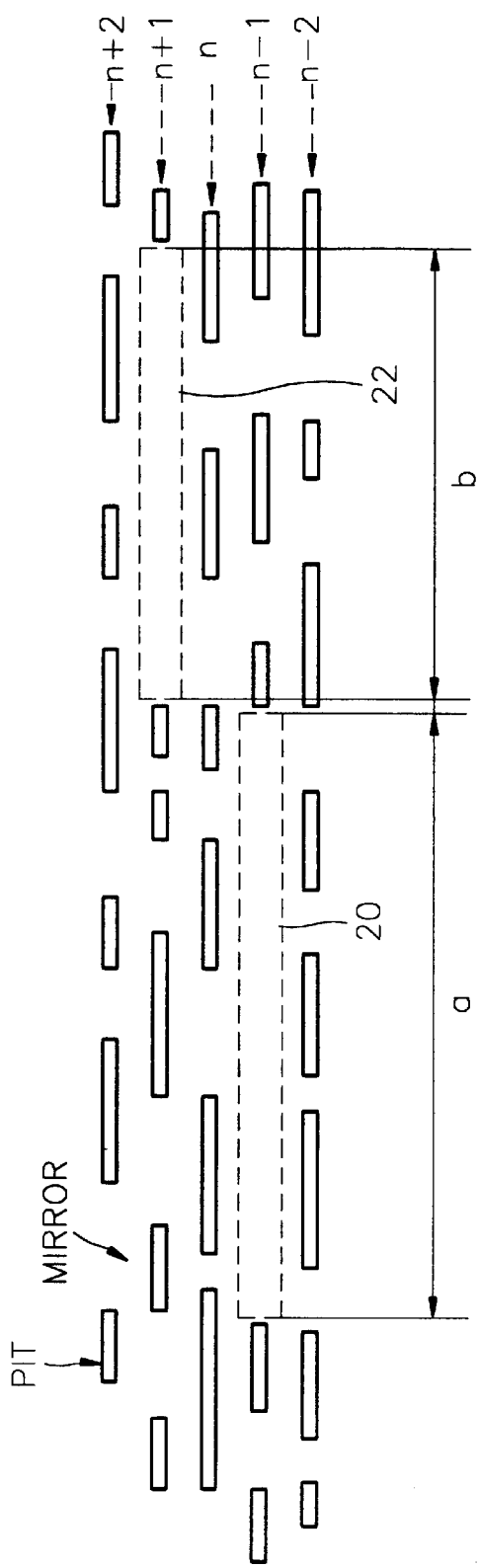
FIG. 5 is a view showing an example of a pattern for tilt detection which is recorded on a recording medium according to a first embodiment of the present invention.

FIG. 5 shows a pattern for tilt detection which is recorded on a recording medium according to a first embodiment of the present invention. The recording medium may comprise, for example, a DVD, a CD, a CD-ROM, or other optical medium. A plurality of tracks, n−2, n−1, n, n+1, n+2, are shown in the drawing. Each track has pits in which a groove is formed on a surface of the disk for recording information and mirrors in which no groove is formed.

Here, the $(n-1)^{th}$ track and the $(n+1)^{th}$ track have a first tilt detection pattern area 20 and a second tilt detection pattern area 22, each indicated by a dotted box, respectively. Only a mirror pattern or a pit pattern is formed in the first and second tilt detection pattern areas 20 and 22, and the length of each of the tilt detection pattern areas is determined within a range in which a tracking error signal does not deviate too much. Here, the first tilt detection pattern area 20 detects a tilt in a lower portion of the drawing, while the second tilt detection pattern area 22 detects a tilt in an upper portion of the drawing.

Figure 6:
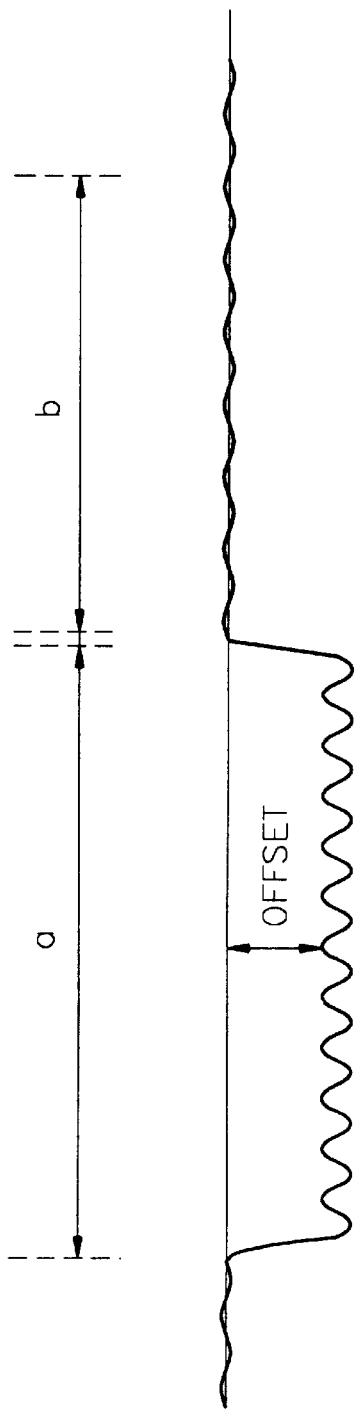
FIG. 6 is a waveform diagram of a tracking error signal generated by the pattern shown in FIG. 5.

FIG. 6 shows the waveform of a tracking error signal generated by the pattern shown in FIG. 5. When a disk having the pattern shown in FIG. 5 is tilted up or down, as shown in FIG. 6, an offset of a tracking signal changes in the first tilt detection pattern area 20 or the second tilt detection pattern area 22.

A series of codes recorded on a track have a high frequency component of several MHz. The tracking error signal by a push-pull method inherently has a component corresponding to a difference signal between the upper track portion and the lower track portion with respect to a current track detected and has a low frequency component of several KHz.

In FIG. 5, when there is accurate tracking, and there is a tilt in the lower portion in the drawing, a tracking difference signal in the first tilt detection pattern area 20 has a changing offset value unlike other areas.

We will assume that the current track detected is the $n^{th}$ track and a mirror pattern is recorded in the first and second tilt detection pattern areas 20 and 22.

Since the first tilt detection pattern area 20 where only a mirror pattern is recorded is in the $(n-1)^{th}$ track in a section a, as shown in FIG. 5, the amount of light reflected by a side lobe generated by a tilt in the lower portion increases compared to other sections.

In the section a, the amount of light reflected by the $(n+1)^{th}$ track is similar to other sections. As a result, the size of a tracking error signal in the section a decreases (here, it is assumed that the tracking error signal is obtained through a pull-push method.). That is, the center line of the tracking error signal goes down.

If there is no tilt, the change in the offset is zero. However, if there is a tilt, an offset is generated as shown in FIGS. 2 and 3. Also, the degree of offset varies according to the amount of tilt. Thus, by detecting the amount of change in the offset in the section a, it is possible to detect the amount of tilt in the lower portion of a disk.

The amount of light reflected by the second tilt detection pattern area 22 in a section b does not increase. The reason is that a side lobe of the upper portion is not generated when a tilt in the lower portion of the drawing (FIG. 5) is generated. That is, the offset of a tracking error signal in the section b does not change.

The tilt detection pattern is divided into two parts (tilt detection pattern areas) because of the possible directions of tilt. That is, a tilt is generated in either an upward direction or a downward direction. The first tilt detection pattern area 20 detects a tilt in the down direction only and the second tilt detection pattern area 22 detects a tilt in the upward direction only. Also, the first and second tilt detection pattern areas 20 and 22 are not parallel to each other with respect to the center of the $n^{th}$ track to prevent a case in which a detection signal is not generated.

Here, it is appropriate that the lengths of the first and second tilt detection pattern areas 20 and 22 are set such that a tracking error signal is not changed. The tilt detection pattern areas 20 and 22 can be formed by a pit pattern instead of a mirror pattern.

FIG. 7 shows another example of a pattern for tilt detection recorded on a recording medium according to a second embodiment of the present invention. The recording medium may comprise, for example, a DVD, a CD, a CD-ROM, or other optical medium. In FIG. 7, a plurality of tracks, n−2, n−1, n, and n+1, are shown. Each track has pits in which a groove is formed on a surface of a disk for recording information and mirrors in which no groove is formed.

Here, a tilt detection pattern area 30 is present on the $(n-1)^{th}$ track as indicated by a dotted box. Either a mirror or pit only is formed in the tilt detection pattern area 30, and the length of the tilt detection pattern area 30 is determined within a range in which a tracking error signal does not deviate too much.

FIG. 8 is a waveform diagram showing a tracking error signal generated by the pattern shown in FIG. 7. In the case in which a disk having the pattern of FIG. 7 is tilted upward, an offset of a tracking error signal varies in the tilt detection pattern area 30 as the $(n-2)^{th}$ track is read, as shown in FIG. 8.

In FIG. 7, assuming that tracking is accurately maintained, the tracking error signal in the tilt detection pattern area 30 has a different offset than in other areas.

If there is no tilt, the value of the offset is zero. When there is an upward tilt, the offset increases upward when the $(n-2)^{th}$ track is read, due to a side lobe generated in the upper portion. On the contrary, when there is a downward tilt, an offset increases downward when the $n^{th}$ track is read, due to a side lobe generated in the lower portion. Also, the offset varies according to the degree of tilt.

When the currently read-out track is the $n^{th}$ track and a downward tilt is generated, the amount of light reflected by the tilt detection pattern area 30 in the $(n-1)^{th}$ track in section c increases.

When the currently read-out track is the $n^{th}$ track and an upward tilt is generated, the amount of light reflected by the tilt detection pattern area 30 in the $(n-1)^{th}$ track in section c does not change, compared with the case in which there is no tilt.

When the currently read-out track is the $n^{th}$ track and a downward tilt is generated, the amount of light reflected by the tilt detection pattern area 30 in the $(n-1)^{th}$ track in section c increases.

When the currently read-out track is the $(n-2)^{th}$ track and a downward tilt is generated, the amount of light reflected by the tilt detection pattern area 30 in the $(n-1)^{th}$ track in section c does not change, compared with the case in which there is no tilt.

When the currently read-out track is the $(n-2)^{th}$ track and an upward tilt is generated, the amount of light reflected by the tilt detection pattern area 30 in the $(n-1)^{th}$ track in section c increases.

That is, in a recording medium having the tilt detection pattern as shown in FIG. 6, an upward or downward tilt is detected on two tracks. Here, the length of the tilt detection pattern area 30 is determined within a range in which a tracking error signal does not deviate too much.

Figure 9A:
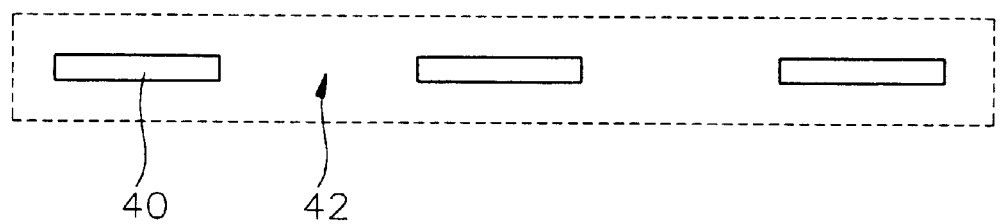
FIGS. 9A and 9B are views showing yet another example of a pattern for tilt detection which is recorded on a recording medium according to a third embodiment of the present invention.
Figure 9B:
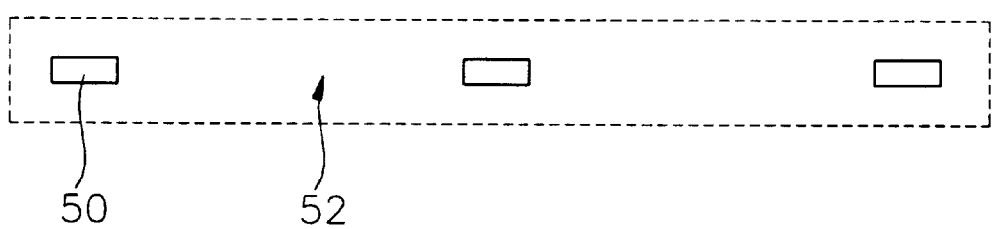

FIGS. 9A and 9B show yet another example of a pattern for tilt detection recorded on a recording medium according to a third embodiment of the present invention. The patterns shown in FIGS. 5 and 7 which have only either a pit or mirror portion are not compatible with the format of a general compact disk. That is, in the case of DVDs, now that the lengths of a pit and a mirror must be either 3T or 14T, a pit or mirror portion having a length longer than 3T or 14T is not acceptable. Thus, compatibility with other general disks is possible by using the patterns shown in FIGS. 9A and 9B. In general, the tilt detection patterns shown in FIGS. 9A and 9B, described herein below, can be used at the same locations as, and therefor substituted for, the tilt detection patterns shown in FIGS. 5 and 7.

In the tilt detection pattern shown in FIG. 9A, a pit 40 having a first length and a mirror 42 having a second length are repeated. Preferably, the first length of the pit 40 is longer than the average length of the code train allowed by a modulation method and the second length of the mirror 42 is shorter than the average length of the code train allowed by the modulation method. Alternatively, the first length of the pit 40 is shorter than the average length of a code train allowed by the modulation method and the second length of the mirror 42 is longer than the average length of the code train allowed by the modulation method.

In the tilt detection pattern shown in FIG. 9B, a pit 50 having a first length and a mirror 52 having a second length are repeated. Preferably, the first length of the pit 50 is the shortest code train allowed by a modulation method and the second length of the mirror 52 is the longest code train allowed by the modulation method. Alternatively, the first length of the pit 50 is the longest code train allowed by the modulation method and the second length of the mirror 52 is the shortest code train allowed by the modulation method. From experiments, a continual pattern of 14T-3T-14T-3T is effective in a DVD recording medium. Here, 3T is a margin bit.

Preferably, the patterns shown in FIGS. 5, 7 and 9 are distributed regularly on a disk. That is, if the pattern is regularly distributed like a servo pattern and an optical disk player can recognize this information, it is possible to detect the tilt of a disk.

Figure 10:
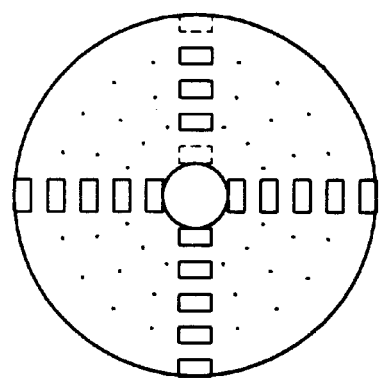
FIG. 10 is a view showing an example of distribution on a disk of the patterns for tilt detection shown in FIGS. 5, 7 and 9.

FIG. 10 shows an example of the tilt detection patterns shown in FIGS. 5, 7 and 9 distributed on a disk. As shown in FIG. 10, a tilt detection pattern is distributed regularly and radially. If an optical disk player can recognize the distribution of the pattern, detection of degree of a tilt in an area where the tilt detection pattern is recorded can be performed.

In some cases, detection of the average degree of tilt of a disk is necessary. That is, the degree of tilt is detected at the inner circumference and the outer circumference of a disk, and then, the average degree of tilt of a disk can be obtained from the above two tilt amounts.

Figure 11A:
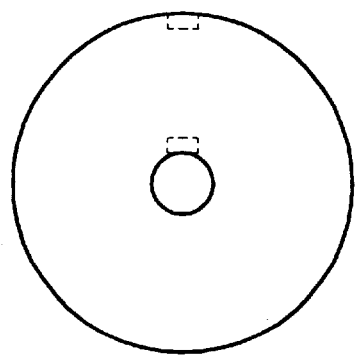
FIGS. 11A through 11B are views showing another example of distribution on a disk of the patterns for tilt detection shown in FIGS. 5, 7 and 9.
Figure 11B:
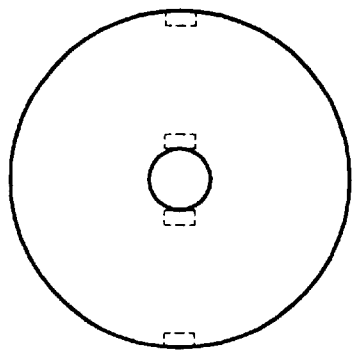

FIGS. 11A and 11B each show a recording medium to detect the average degree of tilt. In FIG. 11A, tilt detection pattern areas are respectively formed at the inner circumference and the outer circumference of a disk. In FIG. 11B, two tilt detection pattern areas are formed at each of the inner and outer circumferences of a disk, symmetrical about a diameter of the disk.

On the disk shown in FIG. 11A, the tilt detection pattern areas shown in FIG. 5 can be formed sequentially on upper and lower tracks which are adjacent with respect to a currently reproduced track. At this time, either using only a tilt detection pattern at the outer circumference or using both the tilt detection patterns at the inner and outer circumferences is possible.

When a tilt of a disk mainly occurs at the outer circumference, as in a dish phenomenon (wherein the disk takes on a concave or convex shape), only the tilt detection pattern at the outer circumference may be used. Also, relative amounts of a tilt at the inner and outer circumferences can be detected using both the tilt detection patterns at the inner and outer circumferences.

In FIG. 11B, the directions of tilt detected from the tilt detection pattern areas at the inner and outer circumferences are opposite. That is, the first tilt detection pattern shown in FIG. 5 is recorded at one of the tilt detection pattern areas at the inner circumference with respect to the currently reproduced track, and the second tilt detection pattern shown in FIG. 5 is recorded at the other tilt detection pattern area. Here, the degree and direction of tilt can be determined by detecting one track.

Likewise, the first tilt detection pattern shown in FIG. 5 is recorded at one of the tilt detection pattern areas at the outer circumference with respect to the currently reproduced track, and the second tilt detection pattern shown in FIG. 5 is recorded at the other tilt detection pattern area. Here, the degree and direction of tilt can be determined by detecting one track.

Figure 12:
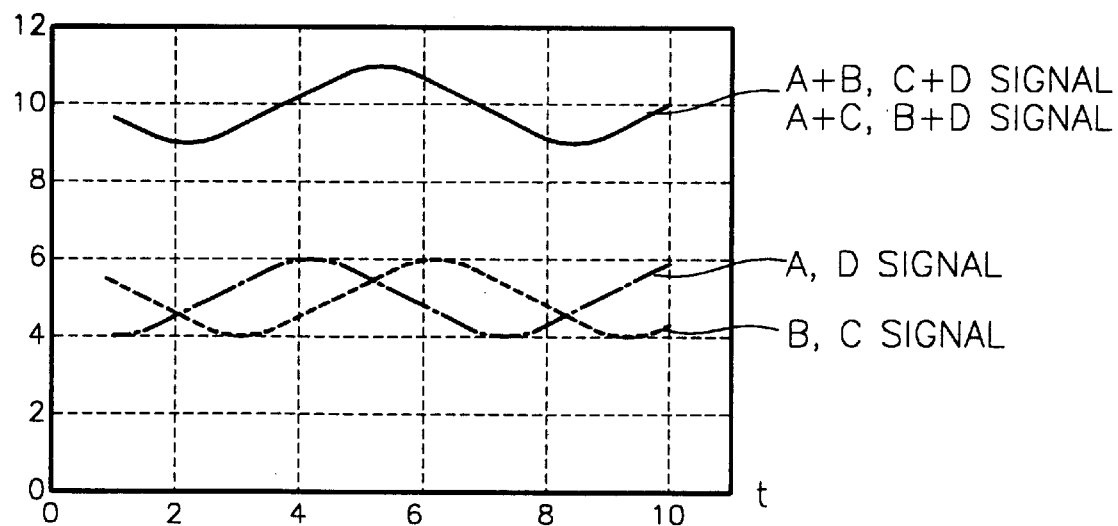
FIG. 12 is a waveform diagram of signals generated by the quadrant photodetector for detecting an optical signal reflected by a recording medium having the pattern for tilt detection according to the embodiments of the present invention, in the case that there is no tilt.

FIG. 12 shows the result of computer simulation of signals generated by a quadrant photodetector for detecting an optical signal reflected by a recording medium having a pattern for tilt detection according to the embodiments of the present invention, in the case that there is no tilt. In FIG. 12, a solid line indicates a push-pull signal or DPD signal; a one-dot chain line indicates a signal A or D; and a dotted line indicates a signal B or C.

When the depth of a pit of a disk is not $\lambda/4$, as shown in FIG. 8, the signal A and D in a proceeding direction of the disk are congruous and have the same values. The signals B and C are reproduced while maintaining a predetermined delay time compared with the signals A and D.

(A+B)/(C+D) for determining a tracking error signal by a push-pull method which is generally used for an optical disk player and (A+C)/(B+D) for determining a tracking error signal by a DPD method has the same size and phase as shown in FIG. 8.

As shown in FIG. 12, it can be seen that a push-pull signal and a DPD signal are the same since both the push-pull signal and the DPD signal are differential signals. Accordingly, it can be seen that the quadrant photodetector accurately traces a currently reproduced track. That is, when tracking is accurately maintained, a reproduced signal is not distorted by the tilt detection pattern adopted in the present invention.

Figure 13:
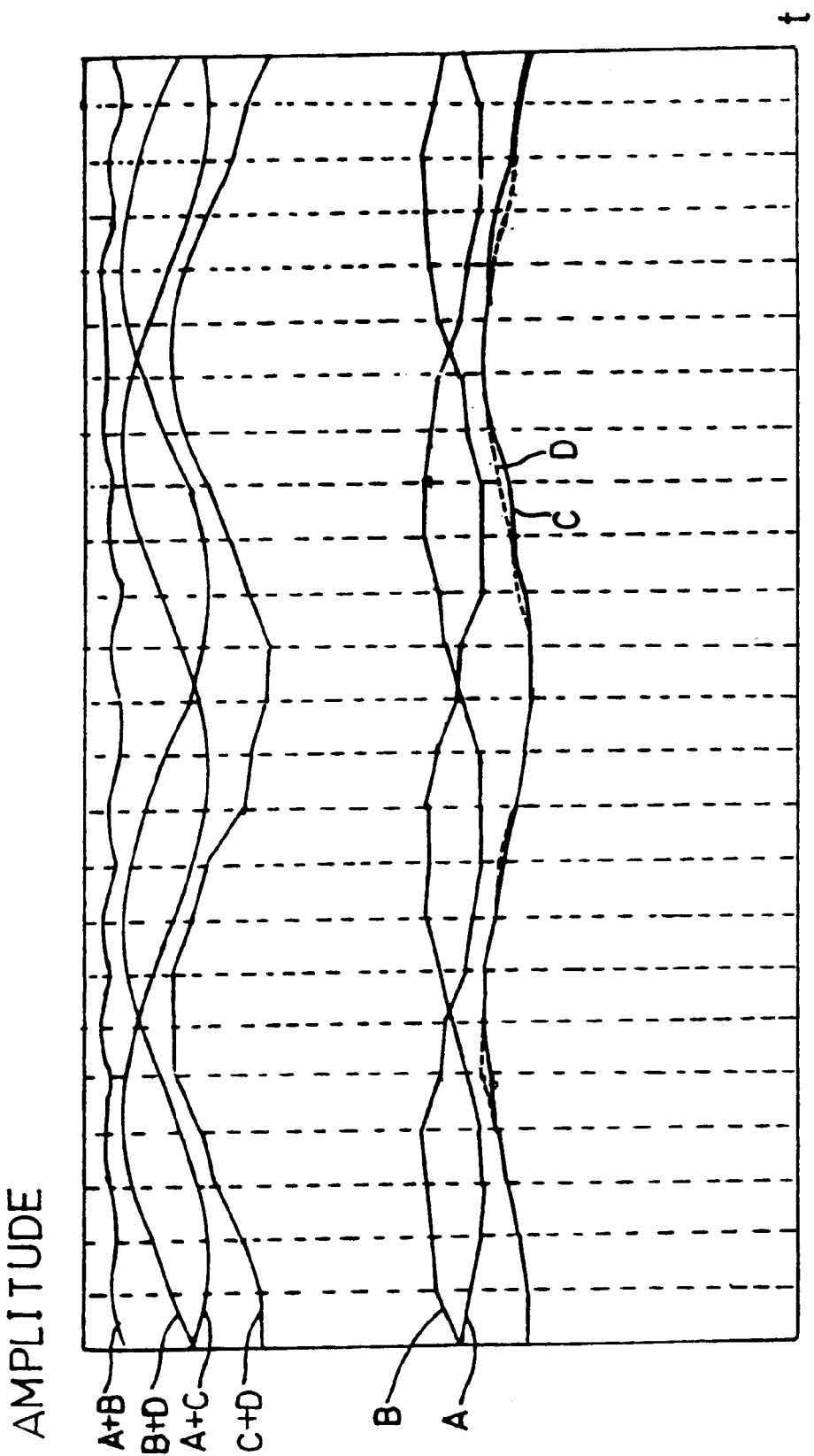
FIG. 13 is a waveform diagram of signals generated by the quadrant photodetector for detecting an optical signal reflected by the recording medium having the pattern for tilt detection according to the embodiments of the present invention, in the case in which there is a tilt.

FIG. 13 shows the result of computer simulation in a state in which a DVD disk is tilted 1°.

When the disk is tilted, asymmetry of a laser beam occurs and side lobes increase as shown in FIGS. 2A–2C and 3A–3C. When a side lobe portion is focused on a tilt detection pattern, an offset is generated at a tracking error signal. The opposite offsets are generated in the first tilt detection pattern area 20 and the second tilt detection pattern area 22 shown in FIG. 5 to show the direction of tilt. However, when the tilt detection area and the direction of a tilt do not match, an offset signal is not generated. Therefore, a recording medium according to the present invention has two different tilt detection patterns recorded on tracks which are sequentially disposed above and below with respect to a reference track, or the same tilt detection patterns recorded on the adjacent tracks.

The phases of the signals A and B are deviated 180° and those of the signals C and D are the same. Thus, it can be seen that the signal A+B has a DC component and the amplitude of the signal C+D is twice of that of each signal. Accordingly, an offset is generated at the push-pull signal (A+B)−(C+D). The DPD signals (A+C) and (B+D) have a phase difference of 90° which directly acts as an offset.

The length of the area for recording the tilt detection pattern according to the present invention can be applied to "Reference signal zone", which is about 0.5–0.9 track, disclosed in the DVD-RAM specification book. Preferably, a continuous pattern of 14T-3T-14T-3T exhibiting a superior tilt detection property is used.

As described above, in a recording medium according to the present invention, since a pattern for tilt detection is recorded in a portion of a disk, the tilt of a disk can be detected by a common quadrant photodetector without an additional apparatus such as a photo coupler. Thus, use of the tilt detection pattern provides easy and accurate detection of a tilt. Particularly, the cost of a product can be reduced since a well-known photodetector is used.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disk on which a code train having a pit pattern or a mirror pattern recorded on a concentrically or spirally formed track, wherein a tilt detection pattern having a predetermined tilt indicating code train is recorded at least in a partial area of the optical disk, such that an amount of tilt is based on an amount of offset in a tracking error signal of a track adjacent to a track including the predetermined tilt indicating code train.

2. The optical disk as claimed in claim 1, wherein said tilt detection pattern is formed as a mirror pattern only.

3. The optical disk as claimed in claim 1, wherein said tilt detection pattern is formed as a pit pattern only.

4. The optical disk as claimed in claim 1, wherein said tilt detection pattern has a length for the tracking error signal which is not deviated due to an occurrence of an offset.

5. The optical disk as claimed in claim 1, wherein said tilt detection pattern is regularly distributed on an entire surface of the optical disk.

6. The optical disk as claimed in claim 5, wherein said tilt detection pattern is radially and regularly distributed on the entire surface of the optical disk.

7. The optical disk as claimed in claim 5, wherein said tilt detection pattern is recorded at an inner circumference and an outer circumference of the optical disk.

8. The optical disk as claimed in claim 7, wherein said tilt detection pattern is recorded plurally at the inner circumference and the outer circumference of the optical disk, respectively.

9. The optical disk as claimed in claim 5, wherein, if numbers of three tracks located adjacently are (n−1), n, and (n+1), said tilt detection pattern is recorded symmetrically and diagonally on the $(n-1)^{th}$ track and $(n+1)^{th}$ track with respect to the $n^{th}$ track.

10. The optical disk as claimed in claim 5, wherein, if numbers of three tracks located adjacently are (n−1), n, and (n+1), said tilt detection pattern is recorded on the $n^{th}$ track.

11. The optical disk as claimed in claim 1, wherein the tilt detection pattern comprises:

a first tilt detection pattern area formed on an adjacent previous track to a currently read track of the optical disk; and a second tilt detection pattern area formed on an adjacent next track to the currently read track of the optical disk.

12. The optical disk as claimed in claim 11, wherein the first and second tilt detection pattern areas are pit patterns only.

13. The optical disk as claimed in claim 11, wherein the first and second tilt detection pattern areas are mirror patterns only.

14. The optical disk as claimed in claim 11, wherein the first tilt detection pattern area is asymmetrical to the second tilt detection pattern area relative to the currently read track.

15. The optical disk as claimed in claim 11, wherein the first tilt detection pattern area is usable to determine a tilt of the optical disk in a first direction while reading the currently read track and the second tilt detection pattern area is usable to determine the tilt of the optical disk in a second direction opposite the first direction while reading the currently read track.

16. The optical disk as claimed in claim 15, wherein the first and second tilt detection pattern areas generate the tracking error signal offset depending upon a direction of tilt of the optical disk, wherein an amplitude of the tracking error signal offset is based upon an amount of the tilt.

17. The optical disk as claimed in claim 11, wherein the first and second tilt detection pattern areas generate the tracking error signal offset depending upon a direction of tilt of the optical disk, wherein an amplitude of the tracking error signal offset is based upon an amount of the tilt.

18. The optical disk as claimed in claim 17, wherein the first tilt detection pattern area generates the tracking error signal offset only if the tilt is in a first direction and the second tilt detection pattern area generates the tracking error signal offset only if the tilt is in a second direction opposite the first direction.

19. The optical disk as claimed in claim 11, wherein each of the first and second tilt detection pattern areas comprises a pattern of pits and mirrors.

20. The optical disk as claimed in claim 11, wherein the optical disk comprises a plurality of the first and second tilt detection pattern areas formed in radial directions of the optical disk.

21. The optical disk as claimed in claim 1, wherein the tilt detection pattern comprises a tilt detection pattern area, wherein the tilt detection pattern area is usable to determine a tilt of the optical disk in first and second directions opposite each other.

22. The optical disk as claimed in claim 21, wherein the tilt detection pattern area is usable to determine the tilt of the optical disk in the first direction while a first track, adjacent at a first side of a second track in which the tilt detection pattern area is formed, is read, and the tilt detection pattern is usable to determine the tilt of the optical disk in the second direction while a third track, adjacent at a second side of the second track in which the tilt detection pattern area is formed, is read.

23. The optical disk as claimed in claim 22, wherein the tilt detection pattern area generates the tracking error signal offset while the first track is being read to determine the tilt in the first direction, and generates the tracking error signal offset while the second track is being read to determine the tilt in the second direction.

24. The optical disk as claimed in claim 23, wherein an amplitude of the tracking error signal offset is based upon an amount of the tilt.

25. The optical disk as claimed in claim 21, wherein the tilt detection pattern area comprises a pattern of pits and mirrors.

26. The optical disk as claimed in claim 25, wherein the optical disk comprises a plurality of the tilt detection pattern areas formed in radial directions of the optical disk.

27. The optical disk as claimed in claim 21, wherein the optical disk comprises a plurality of the tilt detection pattern areas formed in radial directions of the optical disk.

28. The optical disk as claimed in claim 1, wherein the tilt direction pattern comprises first and second tilt detection areas formed in a radial direction at inner and outer circumferences of the optical disk, usable to determine an average degree of the tilt of the optical disk.

29. The optical disk as claimed in claim 28, wherein the tilt direction pattern further comprises third and fourth tilt detection areas formed in a linear relationship with the first and second tilt detection areas and at the inner and outer circumferences of the optical disk, respectively, usable to determine the average degree of the tilt of the optical disk.

30. An optical disk on which a code train having a pit pattern or a mirror pattern recorded on a concentrically or spirally formed track, wherein a tilt detection pattern having a predetermined tilt indicating code train is recorded at least in a partial area of the optical disk, said tilt detection pattern being a repetition of a pattern having a length longer than an average length of a code train usable for the optical disk and a pattern having a length shorter than the average length.

31. An optical disk on which a code train having a pit pattern or a mirror pattern recorded on a concentrically or spirally formed track, wherein a tilt detection pattern having a predetermined tilt indicating code train is recorded at least in a partial area of the optical disk, said tilt detection pattern being a repetition of a maximum length code train having a longest length of code trains usable for the optical disk and a minimum length code train having a shortest length of the code trains usable for the optical disk.

32. An optical disk to be accessed by an optical pickup, comprising:

a plurality of tracks of code trains with pits and mirrors to store information; and a tilt detection pattern formed in at least one of the tracks and having a predetermined tilt indicating code train, such that an amount of tilt is based on an amount of offset in a tracking error signal of a track adjacent to a track including the predetermined tilt indicating code train.

33. The optical disk as claimed in claim 32, wherein the tilt detection pattern comprises first and second tilt detection pattern areas each including at least one of a pit and a mirror and respectively formed in first and second tracks separated by a third track, wherein when the third track is to be read, the tracking error signal offset generated by the first or second tilt detection pattern area determines a tilt direction of the optical disk.

34. The optical disk as claimed in claim 32, wherein an amplitude of the tracking error signal offset varies in accordance with an amount of the tilt of the optical disk.

35. The optical disk as claimed in claim 32, wherein the tilt detection pattern comprises a tilt detection pattern area including at least one of a pit and a mirror formed in first track, wherein when a second track adjacent at a first side of the first track is to be read, the tracking error signal offset generated by the tilt detection pattern area determines a first tilt direction of the optical disk, and when a third track adjacent at a second side of the first track opposite the first side is to be read, the tracking error signal offset generated by the tilt detection pattern area determines a second tilt direction of the optical disk opposite the first tilt direction.

36. An optical disk to be accessed by an optical pickup, comprising:

a plurality of tracks of code trains with pits and mirrors to store information; and a tilt detection pattern formed on the optical disk and having a predetermined tilt indicating code train, such that an amount of tilt is based on an amount of offset in a tracking error signal of only one track adjacent to a track including the predetermined tilt indicating code train.

37. An optical disk to be accessed by an optical pickup, comprising:

a plurality of tracks of code trains with pits and mirrors to store information; and a tilt detection pattern formed on the optical disk and having a predetermined tilt indicating code train, such that an amount of tilt is based on an amount of offset in a tracking error signal of two tracks adjacent to a track including the predetermined tilt indicating code train.

* * * * *